US010627285B2

(12) United States Patent
Krishnamachari et al.

(10) Patent No.: US 10,627,285 B2
(45) Date of Patent: Apr. 21, 2020

(54) LIGHT/VOLTAGE CONVERTER CIRCUIT FOR CONVERTING INTENSITY FLUCTUATIONS OF LIGHT INTO AN ALTERNATING VOLTAGE MEASUREMENT SIGNAL

(71) Applicant: LEICA MICROSYSTEMS CMS GMBH, Wetzlar (DE)

(72) Inventors: Vishnu Vardhan Krishnamachari, Seeheim-Jugenheim (DE); Patric Mrawek, Hassloch (DE); Bernd Widzgowski, Dossenheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 16/081,427

(22) PCT Filed: Mar. 1, 2017

(86) PCT No.: PCT/EP2017/054750
§ 371 (c)(1),
(2) Date: Nov. 29, 2018

(87) PCT Pub. No.: WO2017/149004
PCT Pub. Date: Sep. 8, 2017

(65) Prior Publication Data
US 2019/0086257 A1   Mar. 21, 2019

(30) Foreign Application Priority Data

Mar. 2, 2016  (LU) .......................................... 92983

(51) Int. Cl.
*G01J 1/02* (2006.01)
*G01J 1/46* (2006.01)
(Continued)

(52) U.S. Cl.
CPC ............... *G01J 1/0252* (2013.01); *G01J 1/44* (2013.01); *G01J 1/46* (2013.01); *G01J 3/44* (2013.01)

(58) Field of Classification Search
CPC ............... G01J 1/0252; G01J 1/46; G01J 3/44
See application file for complete search history.

(56) References Cited

U.S. PATENT DOCUMENTS 5,448,161 A     9/1995 Byerley, III et al.
6,225,635 B1 *  5/2001 Brewer ............ G01N 27/44721
                                                    250/374

(Continued)

FOREIGN PATENT DOCUMENTS

EP           1164800 A2    12/2001

*Primary Examiner* — Hugh Maupin
(74) *Attorney, Agent, or Firm* — Leydig, Voit & Mayer, Ltd.

(57) ABSTRACT

A light/voltage converter circuit for converting intensity fluctuations of light into an alternating voltage measurement signal includes a photodiode configured to detect the light and a transformer comprising a primary coil and a secondary coil. The primary coil is connected in a series circuit to the photodiode, and the alternating voltage measurement signal is applied to the secondary coil. An electrical network is configured to block direct current and conduct alternating current. The electrical network is connected in parallel with the series circuit consisting of the primary coil of the transformer and the photodiode.

9 Claims, 4 Drawing Sheets

(51) Int. Cl.
*G01J 3/44* (2006.01)
*G01J 1/44* (2006.01)

(56) References Cited

U.S. PATENT DOCUMENTS

2008/0265133 A1 10/2008 Sawtell et al.
2013/0028593 A1* 1/2013 Melcher ............... H04B 10/808
398/25

* cited by examiner

LIGHT/VOLTAGE CONVERTER CIRCUIT FOR CONVERTING INTENSITY FLUCTUATIONS OF LIGHT INTO AN ALTERNATING VOLTAGE MEASUREMENT SIGNAL

CROSS-REFERENCE TO PRIOR APPLICATIONS

This application is a U.S. National Stage Application under 35 U.S.C. § 371 of International Application No. PCT/EP2017/054750 filed on Mar. 1, 2017, and claims benefit to Luxembourgian Patent Application No. LU 92983 filed on Mar. 2, 2016. The International Application was published in German on Sep. 8, 2017 as WO 2017/149004 A1 under PCT Article 21(2).

FIELD

The present invention relates to a light/voltage converter circuit for converting intensity fluctuations of light into an alternating voltage measurement signal, and to a microscope comprising a light/voltage converter circuit of this kind.

BACKGROUND

Spectroscopic testing methods that use one or more laser sources to illuminate samples are widely used in the field of microscopy. Depending on the type of measurement, the measuring technique in this case is subject to very different requirements.

For example, in SRS microscopy (stimulated Raman scattering; see for example Freudiger et al., Label-Free Biomedical Imaging with High Sensitivity by Stimulated Raman Scattering Microscopy, Science 2008), two laser beams of different wavelengths are used. The two laser beams are guided towards the sample to be tested and are scattered thereon. During amplitude modulation (or, alternatively, polarization modulation or wavelength modulation, for example) of one of the two laser beams, a slight intensity fluctuation in the scattered light (a coherent, laser-like beam) is produced as a useful signal, which fluctuation has a high direct component, however. It is difficult to detect this intensity fluctuation (alternating component) involving a direct component.

The ratio of the direct component to the alternating component may be up to 10exp6, or the direct component of the light may be approximately one Watt, and this results in a significant amount of energy being introduced into the detector element (usually a photodiode). In addition to the increase in temperature due to the radiated light output, the direct component also results in a current flowing through the diode (which is usually reverse biased), and this also contributes to a significant increase in temperature. This has a negative effect on the measurement, in particular as a result of the operating point moving and the internal noise increasing.

The measurement is usually carried out by scanning, i.e. point-by-point raster scanning of the sample. This is usually carried out line by line, the laser being turned off when moving from one line to the next, which may result in an additional false signal when the laser is turned back on.

SUMMARY

In an embodiment, the present invention provides a light/voltage converter circuit for converting intensity fluctuations of light into an alternating voltage measurement signal. The light/voltage converter circuit includes a photodiode configured to detect the light and a transformer comprising a primary coil and a secondary coil. The primary coil is connected in a series circuit to the photodiode, and the alternating voltage measurement signal is applied to the secondary coil. An electrical network is configured to block direct current and conduct alternating current. The electrical network is connected in parallel with the series circuit consisting of the primary coil of the transformer and the photodiode.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
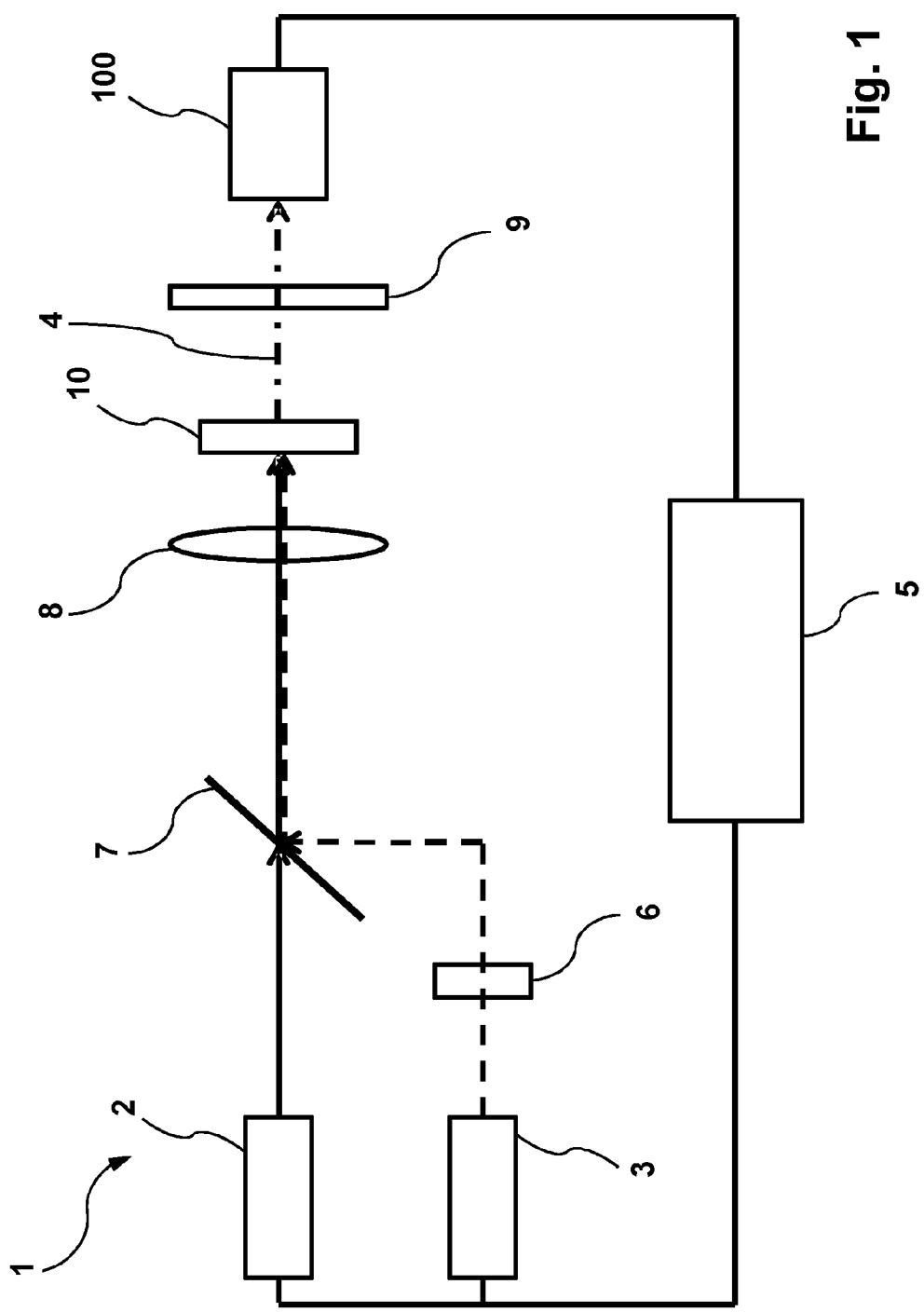
FIG. 1 shows a preferred embodiment of a microscope according to the invention designed as an SRS microscope.

Embodiments of the invention provide a light/voltage converter circuit for detecting intensity fluctuations of light, and a microscope, e.g. an SRS microscope, comprising a light/voltage converter circuit of this kind.

An embodiment of the invention provides a light/voltage converter circuit for converting intensity fluctuations of light into an alternating voltage measurement signal. The light/voltage converter circuit comprises a photodiode as a detector element, the alternating component in the detected light intensity being separated from the direct component by means of a transformer comprising a primary coil and a secondary coil. For this purpose, the light flow of the photodiode is guided through the primary coil such that the alternating component induces an alternating voltage in the secondary coil, which voltage can be detected as the measurement signal. An electrical network which blocks direct current and conducts alternating current is connected in parallel with the series circuit consisting of the primary coil of the transformer and the photodiode, which network closes the photodiode circuit to alternating voltage, and therefore prevents signal losses in further connected components, in particular a voltage source for the photodiode. Furthermore, the network can match the impedance of the voltage source such that the frequency range of the light flow intended to be detected generates as high a level of induction in the transformer as possible. The network can also be frequency-selective so as to perform a filter function with respect to the signal to be detected.

According to an embodiment of the invention, the useful signal is very effectively separated from the direct component and is made available for further analysis, e.g. processing, amplification, etc. Intensity fluctuations involving a direct component can thus be measured in a particularly effective and accurate manner. Furthermore, the light/voltage converter circuit is distinguished by a simple structure having unsophisticated components and associated robustness and reliability. A potential-free measurement signal is provided by means of the transformer, and this makes further processing very flexible. A false signal component during start-up, e.g. when moving from one line to the next, is also reduced, or completely prevented.

Processing the signal induced in the secondary coil is possible if a second electrical network is connected to the secondary coil of the transformer so as to conduct electricity. Processing may involve filtering and/or amplification. The second electrical network can in particular also match the impedance of the voltage measurement device to the rest of the light/voltage converter circuit such that a particularly large measurement signal is obtained.

In particular, a current is induced in the secondary coil. In order for this current to be measured as voltage, it can be converted into a voltage by means of a current-voltage converter. The simplest form of a converter of this kind is an impedor. In a preferred embodiment, the input impedance of the second electrical network is used for current-voltage conversion. At the output of the second electrical network, a voltage amplifier can be used, for example.

It is possible to measure the alternating voltage measurement signal in a particularly simple manner if a voltage measurement device is connected in parallel with the secondary coil of the transformer.

A voltage source is preferably connected in parallel with the series circuit consisting of the primary coil of the transformer and the photodiode. Therefore, the photodiode can be operated in particular in the reverse direction, and this increases the bandwidth of the detected light flow.

An electrode of the photodiode is preferably electrically connected to ground. This is advantageous in that heat can be dissipated simultaneously via the ground connection, in particular if a sufficiently solid electrical connection (e.g. cable or the like) is used for this purpose. For example, this electrode can also be physically connected to an (in particular solid) metal body which can be used in particular simultaneously as a heat sink and as a means for shielding electrical fields, without particularly complex insulators being required. A particularly good shielding effect is achieved if the body has high electrical conductivity. A particularly good cooling effect is achieved if the rest mass of the body is at least 10 times, 20 times, 50 times or 100 times the mass of the photodiode.

The body preferably comprises a recess in which the photodiode is arranged. Therefore, a particularly good cooling and shielding effect can be produced. The photodiode can however also be fastened to a body that does not comprise a recess. This simplifies production.

The photodiode can be fastened to the metal body by soldering, for example. This is a tried-and-tested fastening method also involving electrical contacting.

The body may be a plate or block, for example.

The body may be made entirely or partially of copper and/or aluminum and/or iron. Said body may be tin-plated, zinc-plated or nickel-plated, for example, in order to provide protection against corrosion.

Further advantages and embodiments of the invention can be found in the description and the accompanying drawings.

It goes without saying that the features that have been mentioned above and the features that will be explained in the following can be used not only in the combination specified in each case, but also in other combinations or in isolation, without going beyond the scope of the present invention.

The invention is schematically shown in the drawings on the basis of one embodiment and will be described in the following with reference to the drawings.

FIG. 1 is a highly schematic view of a preferred embodiment of a microscope according to the invention, which microscope is denoted overall by reference numeral 1. The microscope is based on the principle of SRS microscopy, a sample 10 being exposed, point by point, to beams from two lasers 2, 3 of different wavelengths $\lambda_P$ (laser 2) and $\lambda_S$ (laser 3). For this purpose, what is referred to as the Stoke beam which has wavelength $\lambda_S$ and is emitted from laser 3 (Stoke laser) passes through an amplitude modulator 6 for modulating the intensity of the Stoke beam (or, alternatively, an apparatus for wavelength or polarization modulation) in the high frequency range (typically MHz) and is combined with what is referred to as the pump beam which has wavelength $\lambda_P$ and is emitted from laser 2 (pump laser) by means of a dichroic mirror 7. The beams then pass through the microscope lens 8 by means of which they are focused onto the same sample region of the sample 10. A resulting scattered light beam 4 (consisting of the Pump and Stoke beams of which the intensity may have been altered as a result of the SRS effect) first passes through a filter 9 for blocking the Stoke component of the light beam 4 and is then detected by means of a detector which comprises a preferred embodiment of a light/voltage converter circuit 100 according to the invention. A calculation unit 5 controls the components of the microscope 1 and preferably receives and processes the alternating voltage measurement signal supplied by the light/voltage converter circuit 100.

The modulation of the Stoke beam results in an intensity fluctuation in the scattered pump beam. In the resulting light beam 4, downstream of the filter 9, there is a higher direct component, based on the intensity of the light beam, on which direct component a smaller alternating component is superimposed.

The measurement is usually carried out by scanning, i.e. point-by-point raster scanning of the sample. This is usually carried out line by line, it being possible to turn off the laser when moving from one line to the next.

Figure 2:
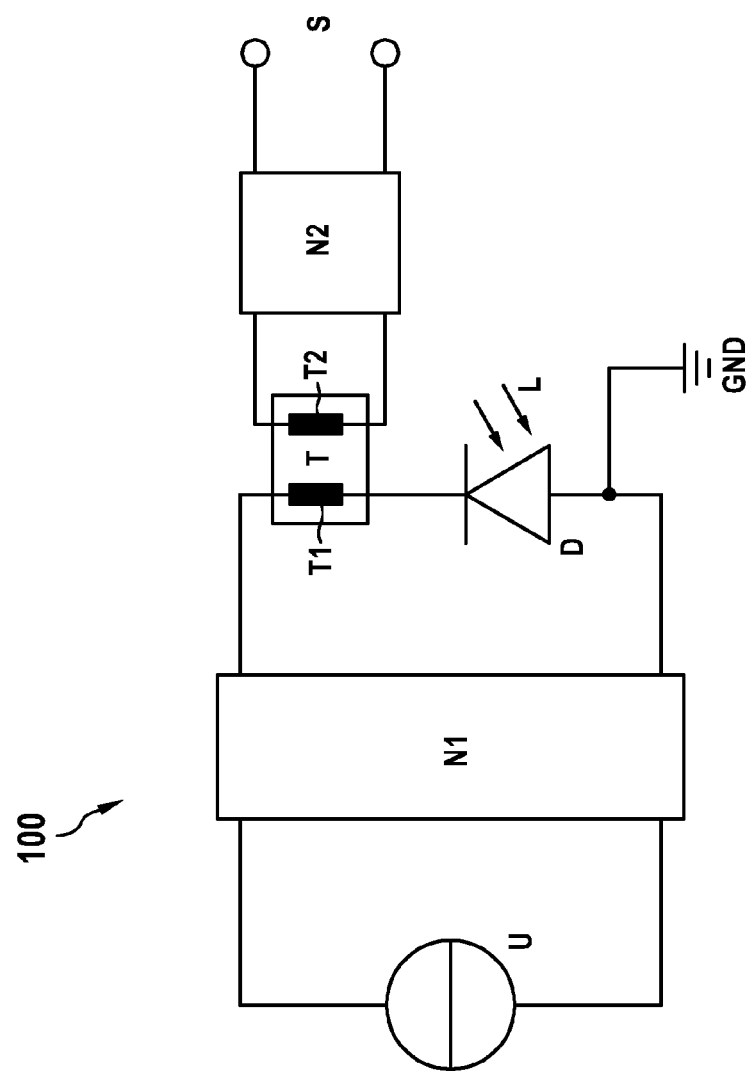
FIG. 2 is a schematic circuit diagram of a preferred embodiment of a light/voltage converter circuit according to the invention.

FIG. 2 is a schematic circuit diagram of a preferred embodiment of a light/voltage converter circuit 100 according to the invention. The light/voltage converter circuit 100 converts the intensity fluctuations, described with reference to FIG. 1, in the light beam 4, indicated by arrow L in FIG. 2, into an alternating voltage measurement signal.

The light/voltage converter circuit 100 comprises a photodiode D which is connected in series to a primary coil T1 of a transformer T. An electrical network N1 which blocks direct current and conducts alternating current is connected in parallel with the series circuit consisting of the primary coil T1 of the transformer T and the photodiode D. Furthermore, a voltage source U is connected in parallel with the series circuit consisting of the primary coil T1 of the transformer T and the photodiode D.

By means of the voltage source U, the photodiode D can be operated in the reverse direction such that a light flow having a particularly large bandwidth can be generated by means of the photodiode D.

The electrical network N1 which blocks direct current and conducts alternating current closes the alternating current circuit through the photodiode D and the primary coil T1 of the transformer T such that the alternating current component in question does not have to flow via the voltage source U, which would result in distortions or interferences. Furthermore, the network N1 can match the impedance of the closed alternating current circuit such that the alternating component generates as high a level of induction in the transformer T as possible. In so doing, the impedance value is minimized for the frequency of the alternating component.

In the simplest case, the network N1 can consist of an individual capacitor. Additionally, the network can comprise further L, R and C elements (inductors, resistors and capacitors) which reduce the impedance of the resonant circuit at the frequency of the alternating current component in question.

In the transformer T, the alternating component of the current from the primary coil T1 is induced in a secondary coil T2 such that, on the secondary side, only the alternating component, separate from the direct component, is applied, as an alternating voltage measurement signal, to an output S, to which a voltage measurement device, for example an ADC converter of the calculation unit 5 from FIG. 1, can be connected in particular.

In order to preprocess the alternating voltage measurement signal, a second electrical network N2 is provided which, for example, filters and/or amplifies the alternating voltage measurement signal. Furthermore, in this network, the impedance of the light/voltage converter circuit can be matched to a connected voltage measurement device.

The second electrical network N2 can contain series and/or parallel circuits of R, L or C elements. Impedance-matching circuits are known in radio-frequency engineering ("matching structures"), for example L, T and Pi matching structures. One or more impedance-matching circuits can be connected in series in network N2 in order to achieve the desired result.

Figure 3:
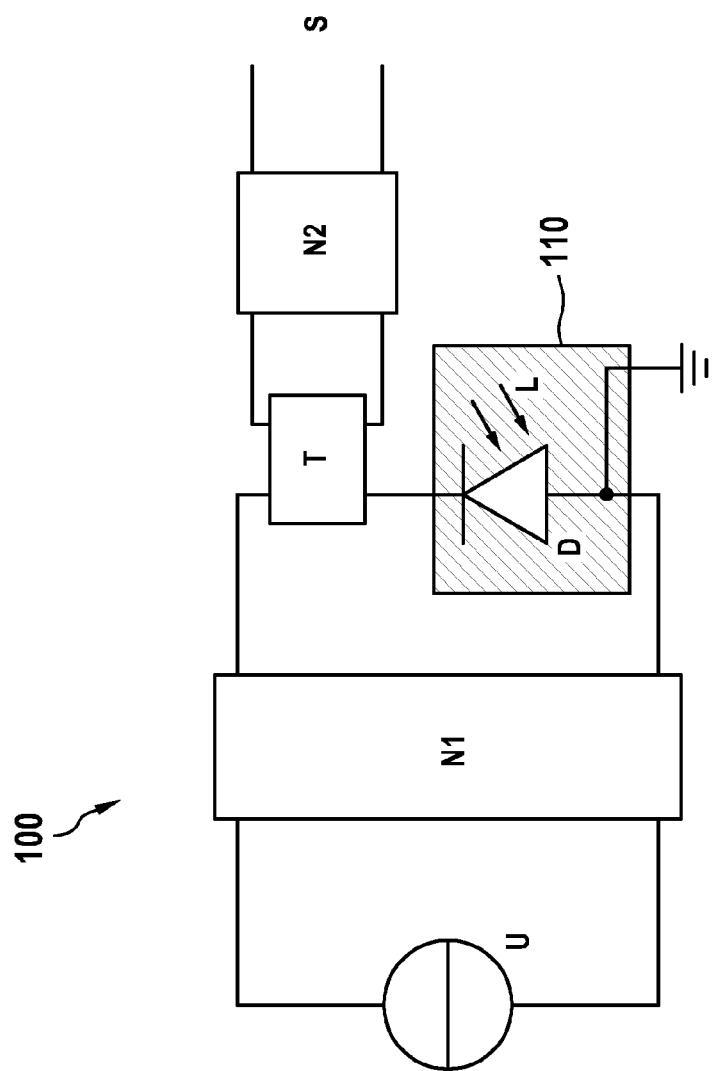
FIG. 3 is the same as FIG. 2 but shows an additional metal body for the photodiode.

FIG. 3 again shows the light/voltage converter circuit 100 from FIG. 2, the photodiode D being connected to electrical ground and to a solid metal body 110 by means of an electrode (in this case the anode). The body 110 may be, for example, a copper plate, which may be tin-plated in particular so as to provide protection against corrosion and/or so as to make it simpler to solder on the photodiode. The copper plate 110 is used as a heat sink for removing the heat input generated by the light irradiation and as a shield against electrical and/or electromagnetic interferences. The body may comprise a recess, e.g. a cuboid or cylindrical recess, in which the photodiode is arranged.

Figure 4B:
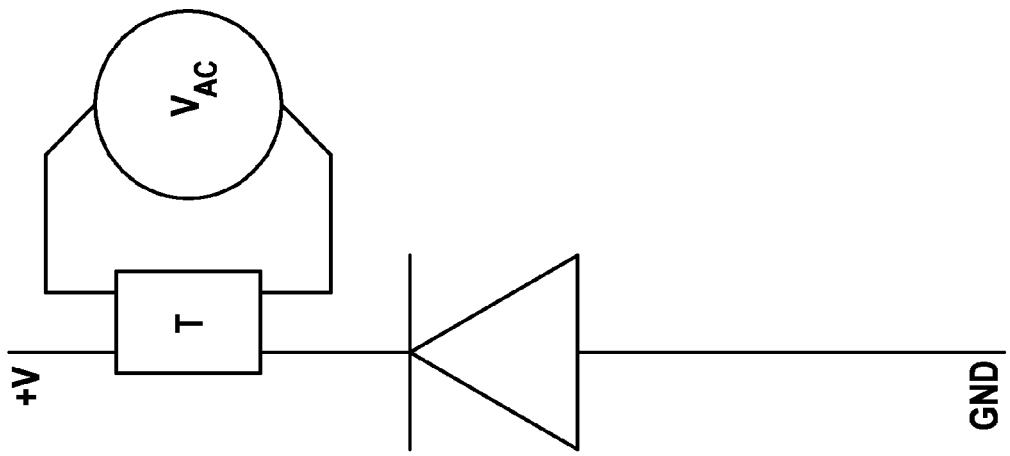
FIG. 4b shows a second preferred embodiment for connecting the photodiode of a light/voltage converter circuit according to the invention to ground.
Figure 4A:
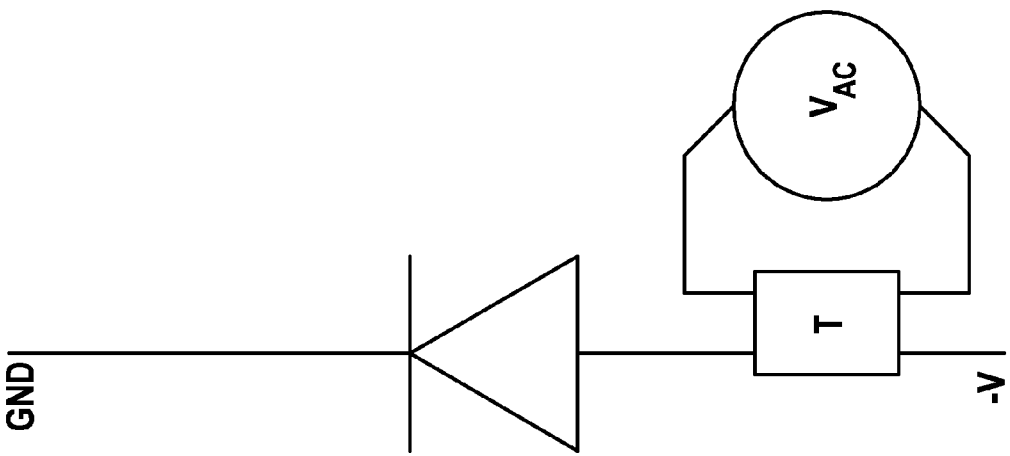
FIG. 4a shows a first preferred embodiment for connecting the photodiode of a light/voltage converter circuit according to the invention to ground.

The above-described wiring of the photodiode D in which the anode is connected to electrical ground and optionally to the metal body 110 is shown once again in FIG. 4b, whereas FIG. 4a shows an alternative preferred embodiment in which the cathode of the photodiode D is connected to electrical ground and optionally to the metal body 110. In this case (FIG. 4a), the primary coil of the transformer T is located between the anode of the photodiode D and a negative supply voltage.

Finally, it is noted very particularly that the embodiments discussed above are only used to describe the claimed teaching; however, this teaching is not limited to these embodiments. In particular, the above-described embodiments could be combined with one another where possible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A light/voltage converter circuit for converting intensity fluctuations of light into an alternating voltage measurement signal, the light/voltage converter circuit comprising:
   a photodiode configured to detect the light having an electrode which is electrically connected to ground and connected to a metal body, wherein the mass of the metal body is at least 10 times the mass of the photodiode and/or the photodiode is arranged in a recess in the metal body;
   a transformer comprising a primary coil and a secondary coil, wherein the primary coil is connected in a series circuit to the photodiode, and wherein the alternating voltage measurement signal is applied to the secondary coil; and
   an electrical network configured to block direct current and conduct alternating current, wherein the electrical network is connected in parallel with the series circuit consisting of the primary coil of the transformer and the photodiode.

2. The light/voltage converter circuit according to claim 1, further comprising a second electrical network which is connected to the secondary coil of the transformer so as to conduct electricity.

3. The light/voltage converter circuit according to claim 1, further comprising a voltage source which is connected in parallel with the series circuit consisting of the primary coil of the transformer and the photodiode.

4. The light/voltage converter circuit according to claim 1, wherein the electrode is connected to the metal body by soldering.

5. The light/voltage converter circuit according to claim 4, wherein the mass of the metal body is at least 10 times the mass of the photodiode.

6. The light/voltage converter circuit according to claim 4, wherein the metal body is designed as a supply cable, metal sheet, plate or block, and/or wherein the metal body is made entirely or partially of copper and/or aluminum and/or iron.

7. The light/voltage converter circuit according to claim 4, wherein the photodiode is arranged in the recess in the metal body.

8. The light/voltage converter circuit according to claim 1, further comprising a measurement voltage output configured to output the alternating voltage measurement signal, wherein the measurement voltage output is connected in parallel with the secondary coil of the transformer.

9. A microscope comprising the light/voltage converter circuit according to claim 1.

* * * * *